(12) United States Patent
Klein et al.

(10) Patent No.: US 11,900,137 B2
(45) Date of Patent: Feb. 13, 2024

(54) CONFIGURABLE IN-APPLICATION EVENT LOGGING SERVICE

(71) Applicant: SAP SE, Walldorf (DE)

(72) Inventors: Udo Klein, Oftersheim (DE); Achim Seubert, Mannheim (DE); Lukas Melzer, Bretten (DE); Daniel Goldmann, Mannheim (DE)

(73) Assignee: SAP SE, Walldorf (DE)

( * ) Notice: Subject to any disclaimer, the term of this patent is extended or adjusted under 35 U.S.C. 154(b) by 67 days.

(21) Appl. No.: 17/672,540

(22) Filed: Feb. 15, 2022

(65) Prior Publication Data

US 2023/0259379 A1    Aug. 17, 2023

(51) Int. Cl.
 *G06F 9/455* (2018.01)
 *G06F 9/54* (2006.01)

(52) U.S. Cl.
 CPC .......... *G06F 9/45529* (2013.01); *G06F 9/542* (2013.01)

(58) Field of Classification Search
 CPC .............................. G06F 9/45529; G06F 9/542
 See application file for complete search history.

(56) References Cited

U.S. PATENT DOCUMENTS

| | | | | |
|---|---|---|---|---|
| 2003/0005173 A1* | 1/2003 | Shah | ............ | H04L 41/0677 709/200 |
| 2003/0225872 A1* | 12/2003 | Bartek | ............ | G06F 11/3476 714/E11.181 |
| 2004/0111406 A1* | 6/2004 | Udeshi | ............ | G06F 16/9027 |
| 2004/0246973 A1* | 12/2004 | Hoang | ............ | H04L 45/62 370/395.21 |
| 2008/0275951 A1* | 11/2008 | Hind | ............ | H04L 67/02 709/224 |
| 2009/0082918 A1* | 3/2009 | Hendrix, Jr. | ............ | G07C 5/0858 701/31.4 |
| 2010/0030789 A1* | 2/2010 | Goto | ............ | G06F 11/1658 711/E12.001 |
| 2010/0093316 A1* | 4/2010 | Doppler | ............ | H04M 1/72403 455/414.1 |
| 2014/0089399 A1* | 3/2014 | Chun | ............ | G06Q 50/01 709/204 |
| 2015/0277942 A1* | 10/2015 | Rork | ............ | G06F 9/44505 701/31.4 |
| 2016/0070564 A1* | 3/2016 | Wu | ............ | G06F 11/3476 717/120 |
| 2016/0072840 A1* | 3/2016 | Iyer | ............ | H04L 63/20 726/1 |

(Continued)

*Primary Examiner* — Tuan C Dao
(74) *Attorney, Agent, or Firm* — Mintz Levin Cohn Ferris Glovsky and Popeo, P.C.

(57) ABSTRACT

A method for configurable in-application event logging may include receiving, from a client device, one or more user inputs specifying at least one of an event of interest associated with an operation of a software application and a data to collect in response to the event of interest. A logging agent may be configured, based on the user inputs, to respond to the specified event of interest by generating one or more log messages including the specified data. The logging agent may be as a first programming code embedded within a second programming code implementing the software application such that the logging agent is able to access a context of each executing instance of the software application. Related systems and computer program products are also provided.

20 Claims, 5 Drawing Sheets

(56) References Cited

U.S. PATENT DOCUMENTS

| | | | |
|---|---|---|---|
| 2016/0094509 A1* | 3/2016 | Ye | H04L 67/306 |
| | | | 709/206 |
| 2016/0364616 A1* | 12/2016 | McLean | G06F 3/0346 |
| 2017/0099177 A1* | 4/2017 | Tsuchida | G06F 11/34 |
| 2018/0018436 A1* | 1/2018 | Opitz | G06F 40/56 |
| 2018/0183690 A1* | 6/2018 | Yamanashi | H04L 41/069 |

* cited by examiner

CONFIGURABLE IN-APPLICATION EVENT LOGGING SERVICE

TECHNICAL FIELD

The subject matter described herein relates generally to cloud native computing and more specifically to an in-application configurable event logging service.

BACKGROUND

An enterprise may rely on a suite of enterprise software applications for sourcing, procurement, supply chain management, invoicing, and payment. These enterprise software applications may provide a variety of data processing functionalities including, for example, billing, invoicing, procurement, payroll, time and attendance management, recruiting and onboarding, learning and development, performance and compensation, workforce planning, logistics, and/or the like. Examples of enterprise software applications may include enterprise resource planning (ERP) software, customer relationship management (CRM) software, and/or the like. Data associated with multiple enterprise software applications may be stored in a common database in order to enable integration across different enterprise software applications. Moreover, to provide access to multiple end users from different geographic locations, many enterprise software applications may be deployed as a web-based application (e.g., a software-as-a-service (SaaS)) such that the functionalities of the enterprise software applications are available for remote access.

SUMMARY

Systems, methods, and articles of manufacture, including computer program products, are provided for configurable in-application event logging. In some example embodiments, there is provided a system that includes at least one processor and at least one memory. The at least one memory may include program code that provides operations when executed by the at least one processor. The operations may include: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

In some variations, one or more features disclosed herein including the following features can optionally be included in any feasible combination. The operations may further comprise: in response to receiving the one or more user inputs, determining a first request identifier associated with the one or more user inputs; and configuring the logging agent to tag the one or more log messages with the first request identifier.

In some variations, the one or more user inputs may further specify a data to collect in response to the event of interest. The logging agent may be further configured to generate the one or more log messages to include the data.

In some variations, the first programming code implementing the logging agent may be included in a main program loop of the software application.

In some variations, the first programming code implementing the logging agent may be embedded within the second programming code implementing the software application such that an instance of the logging agent resides within each executing instance of the software application.

In some variations, the instance of the logging agent may respond to the specified event of interest occurring during an execution of the software application by at least accessing a context of the executing instance of the software application and generating the one or more log messages to include information associated with the context of the executing instance of the software application.

In some variations, the information may include a value of one or more variables operated upon by the executing instance of the software application.

In some variations, the one or more user inputs may include a configuration for the logging agent. The configuration may be stored in an in-memory data structure comprising a distributed, in-memory key-value database, cache, and message broker.

In some variations, the logging agent may be configured to respond to a first log message indicating an occurrence of the specified event of interest by at least generating a second log message including information associated with the specified event of interest.

In some variations, the software application may include an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

In another aspect, there is provided a method for configurable in-application event logging. The method may include: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

In some variations, one or more features disclosed herein including the following features can optionally be included in any feasible combination. The method may further include: in response to receiving the one or more user inputs, determining a first request identifier associated with the one or more user inputs; and configuring the logging agent to tag the one or more log messages with the first request identifier.

In some variations, the one or more user inputs may further specify a data to collect in response to the event of interest. The logging agent may be further configured to generate the one or more log messages to include the data.

In some variations, the first programming code implementing the logging agent may be included in a main program loop of the software application.

In some variations, the first programming code implementing the logging agent may be embedded within the second programming code implementing the software application such that an instance of the logging agent resides within each executing instance of the software application.

In some variations, the instance of the logging agent may respond to the specified event of interest occurring during an execution of the software application by at least accessing a context of the executing instance of the software application and generating the one or more log messages to include information associated with the context of the executing instance of the software application.

In some variations, the information may include a value of one or more variables operated upon by the executing instance of the software application.

In some variations, the one or more user inputs may include a configuration for the logging agent. The configuration may be stored in an in-memory data structure comprising a distributed, in-memory key-value database, cache, and message broker.

In some variations, the logging agent may be configured to respond to a first log message indicating an occurrence of the specified event of interest by at least generating a second log message including information associated with the specified event of interest.

In another aspect, there is provided a computer program product including a non-transitory computer readable medium storing instructions. The instructions may cause operations may executed by at least one data processor. The operations may include: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes with respect to cloud-based enterprise software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A software application, such as an enterprise software application, may provide a variety of solutions for sourcing, procurement, supply chain management, invoicing, and payment. For example, the software application may perform various data processing functionalities such as billing, invoicing, procurement, payroll, time and attendance management, recruiting and onboarding, learning and development, performance and compensation, workforce planning, and logistics. In instances where the software application is licensed and delivered as a cloud-based service (e.g., a software-as-a-service (SaaS) and/or the like), the cloud provider hosting the software application may provide an event logging service to record significant events that occur during the operation of the software application. However, conventional event logging services are preconfigured to log a fixed set of events and are therefore unable to collect additional system information, such as the context of the software application, in response to certain events of interest. While constantly monitoring the operation of the software application for the occurrence of certain events is impractical, indiscriminately collecting any or all potential information is equally inefficient, especially when the events of interest are transient or rarely occur.

In some example embodiments, a configurable in-application event logging service may be configured to respond to one or more events of interests defined by one or more user inputs. For example, upon the occurrence of an event of interest specified by the one or more user inputs, the configurable in-application event logging service may collect information specified by the one or more user inputs. Moreover, the programming code implementing the configurable in-application event logging service may be integrated with the programming code of a software application. For instance, the programming code implementing the configurable in-application event logging service may be a part of the main program loop of the software application. The configurable in-application event logging service may therefore reside within each executing instance of the software application. As such, when an event of interest occurs during the execution of the software application, the configurable in-application event logging service is able to access the context of that executing instance of the software application and collect additional information, such as the values of one or more variables, that are otherwise unavailable to an event logging service residing outside of the executing instance of the software application.

Figure 1:
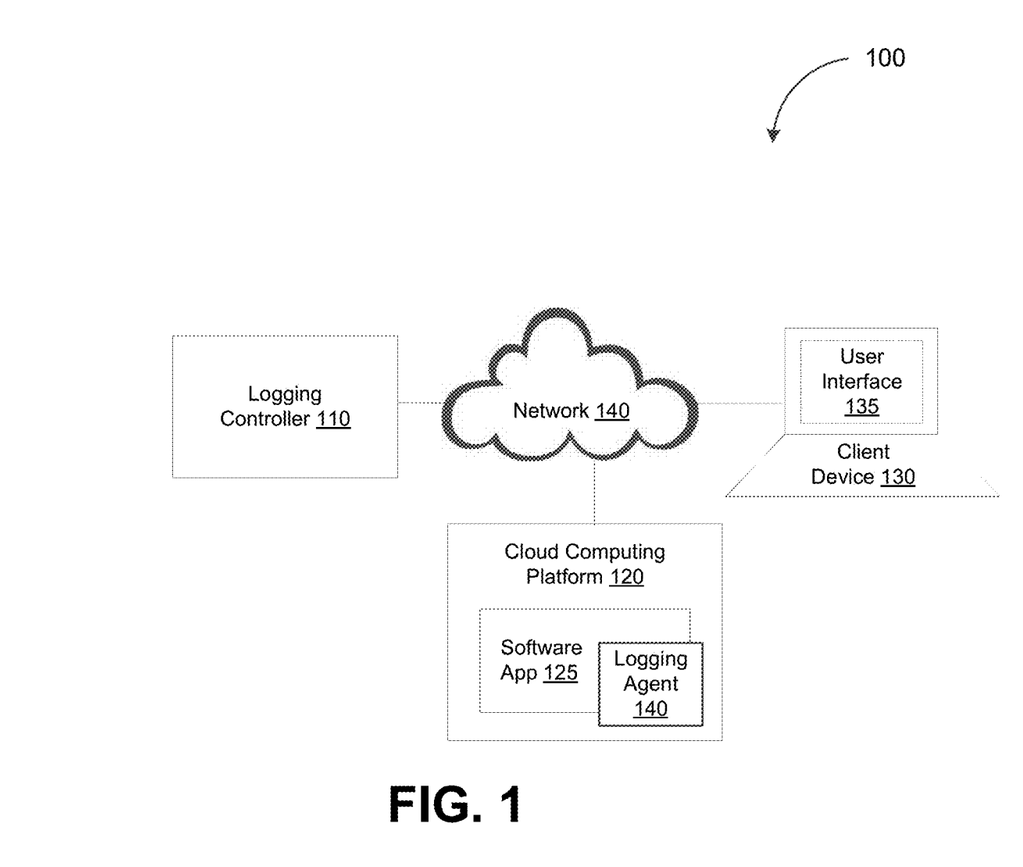
FIG. 1 depicts a system diagram illustrating an example of a cloud computing system, in accordance with some example embodiments.

FIG. 1 depicts a system diagram illustrating an example of a cloud computing system 100, in accordance with some example embodiments. Referring to FIG. 1, the cloud computing system 100 may include a logging controller 110, a cloud computing platform 120 hosting a software application 125, and a client device 130. As shown in FIG. 1, the logging controller 110, the cloud computing platform 120, and the client device 130 may be communicatively coupled via a network 140. The software application 125 may be an enterprise software application such as an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application. The client device 130 may be a processor-based device including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

Referring again to FIG. 1, the client device 130 may receive one or more user inputs for configuring, via the logging controller 110, a logging agent 140. For example, the logging agent 140 may be configured to respond to certain events of interest that occur during the operation of the software application 125. Moreover, the logging agent 140 may be configured to collect specific data upon detecting the occurrence of certain events of interest. Table 1 below depicts examples of configuration parameters for the logging agent 140.

TABLE 1

```
/**
 * Trigger robotic log investigation as defined in the _triggers table
 *
 * @param {object} logger - the logger where messages can be
 logged to
 *
 * @param {string} layer - the layer (aka path) of the log message
 * @param {string} level - the (severity) level of the log message
 * @param {string} message - the text of the log message
 * @param {array} args - whatever other parameters are written
 into the log
 * @returns {Promise<void>}
 */
```

In some example embodiments, the one or more user inputs may specify an event of interest associated with the software application 125 and identify the information that is to be collected upon the occurrence of the event. Accordingly, when the event of interest specified by the one or more user inputs occurs during the execution of the software application 125, the logging agent 140 may be configured to respond to the event of interest by at least collecting the information specified by the one or more user inputs. The client device 130 may be associated with one of multiple tenants associated with the cloud computing platform 120. The one or more user inputs may therefore specify tenant-specific configurations for the logging agent 140. For example, the logging agent 140 may be configured to respond to events that are of interest to a particular tenant. In some cases, the logging agent 140 may be further configured to respond to such events by at least collecting tenant-specific data as defined by the one or more user inputs.

In some example embodiments, the logging controller 110 may assign, to each request to track one or more events of interest associated with the software application 125, a corresponding request identifier. For example, in response to a first user input configuring the logging agent 140 to respond to one or more first events of interest, the logging controller 110 may determine a first request identifier that the logging agent 140 may use to tag log messages associated with the occurrence of the one or more first events of interest. Meanwhile, in response to a second user input configuring the logging agent 140 to respond to one or more second events of interest, the logging controller 110 may determine a second request identifier that the logging agent 140 may use to tag log messages associated with the occurrence of the one or more second events of interest. The first request identifier and the second request identifier may enable a differentiation between log messages associated with different requests, which may further originate from different tenants in instances where the cloud computing platform 120 supports multiple tenants. For instance, the logging controller 110 may categorize, based at least on the first request identifier and the second request identifier, the different log messages generated by the logging agent 140. Furthermore, the logging controller 110 determine, based at least on the first request identifier and the second request identifier, the respective recipients of the log messages associated with the occurrence of the one or more first events of interest and the one or more second events of interest.

As shown in FIG. 1, the logging agent 140 may be deployed as a part of the software application 125. That is, a first programming code implementing the logging agent 140 may be incorporated in a second programming code implementing the software application 125 (e.g., within the main program loop) such that the logging agent 140 is embedded in the runtime of the software application 125. An instance of the logging agent 140 with configurations specific to a particular tenant may therefore reside within each executing instance of the software application 125 associated with that particular tenant. As such, when an event of interest occurs during the execution of the software application 125, the logging agent 140 is able to access the context of that executing instance of the software application 125 and collect information that is unavailable to an event logging service residing outside of the executing instance of the software application 125. For example, in response to the occurrence of the event of interest, the logging agent 140 may collect the values of one or more variables operated upon by the executing instance of the software application 125 and generate one or more corresponding log messages.

Figure 2:
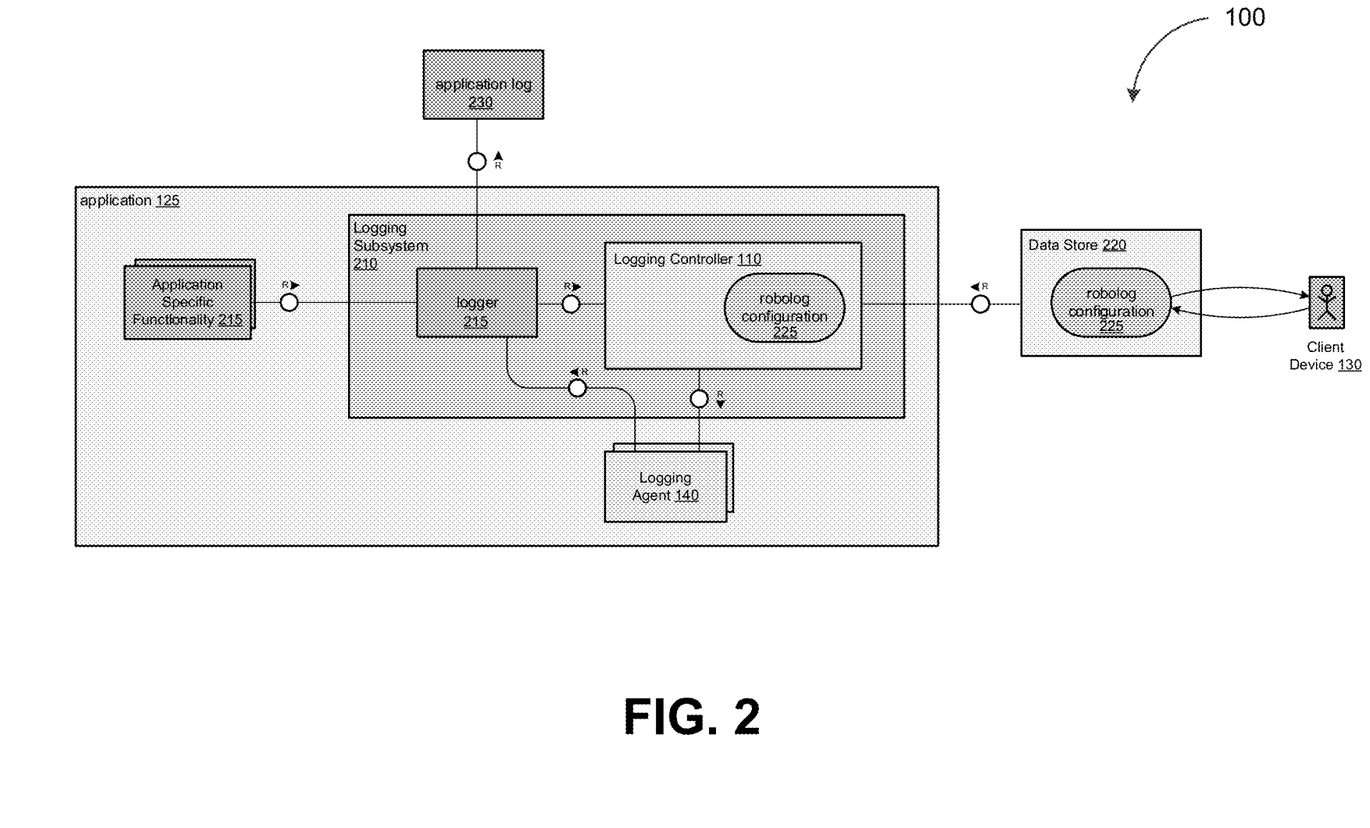
FIG. 2 depicts a block diagram illustrating an example of data flow associated with a configurable in-application event logging service, in accordance with some example embodiments.

FIG. 2 depicts a block diagram illustrating an example of data flow associated with a configurable in-application event logging service, in accordance with some example embodiments. Referring to FIGS. 1-2, the logging controller 110 may receive, from the client device 130, one or more inputs defining a configuration 225 for the logging agent 140. In the example shown in FIG. 2, the configuration 225 for the logging agent 140 may be stored in a data store 220 which may be, for example, an in-memory data structure used as a distributed, in-memory key-value database, cache, and message broker. Moreover, in the example shown in FIG. 2, the logging controller 110 may be a part of a logging subsystem 210 associated with the software application 125.

Figure 3:
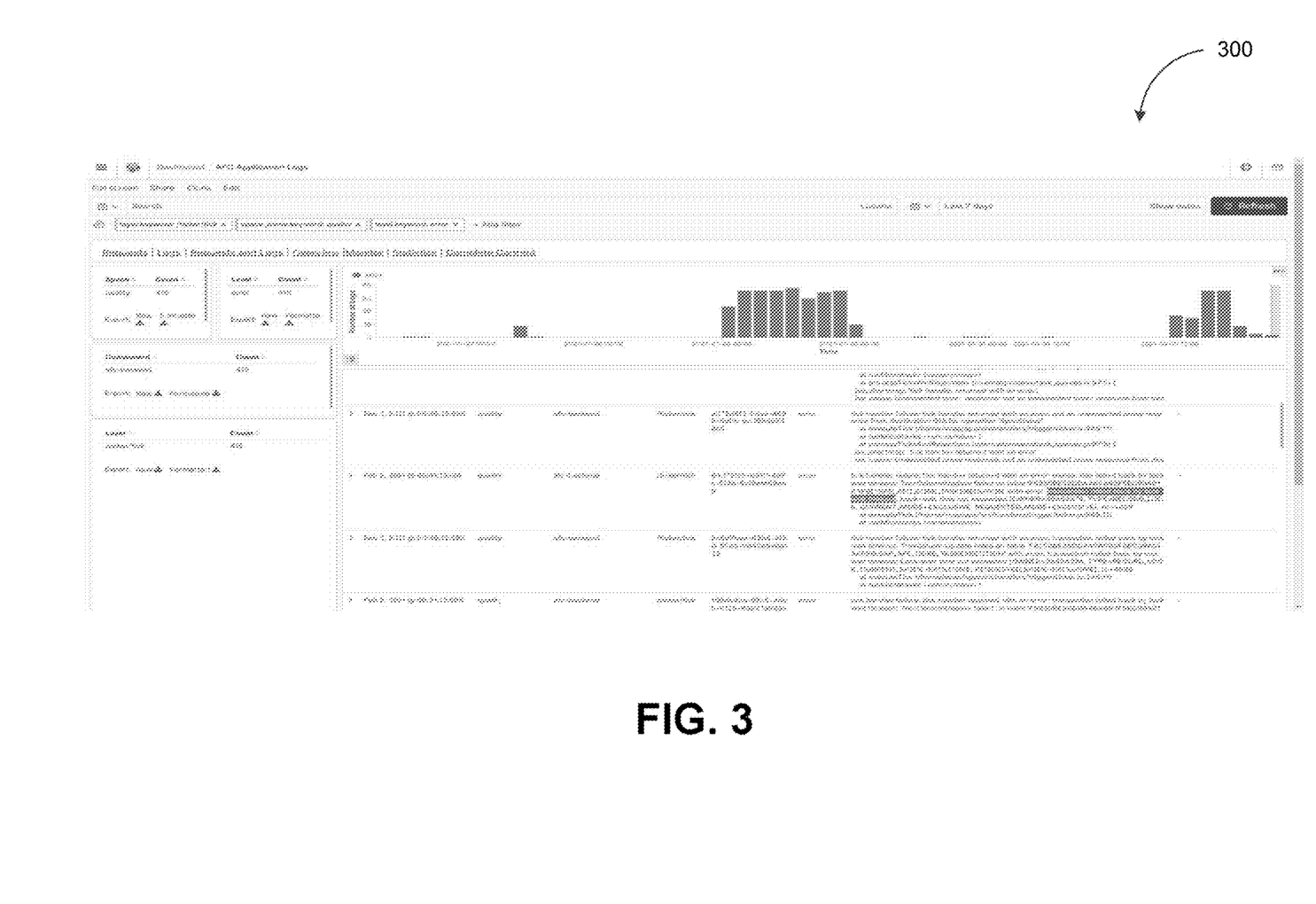
FIG. 3 depict a screenshot of a user interface displaying various examples of log messages, in accordance with some example embodiments.

Referring again to FIG. 2, the logging subsystem 210 may include a logger 215, which may be configured to record significant events that occur during the operation of the software application 125. For example, while the software application 125 performs one or more application specific functionalities 215, the logger 215 may respond to the occurrence of a significant event by writing, to an application log 230, one or more corresponding log messages. To further illustrate, FIG. 3 depict a screenshot of a user interface 300 displaying various examples of log messages that may be present in the application log 230. One log message shown in the user interface 300 indicates that the software application 125 was unable to update table F8250BE36DDA46A693F5EC99A01AAF9D:SAP_AFC_CORE_TASKEXECUTION due to a lock wait timeout. Table 2 below includes the details provided by the log message.

the logging controller 110 to identify and group these log messages as belonging to the same request.

Figure 4:
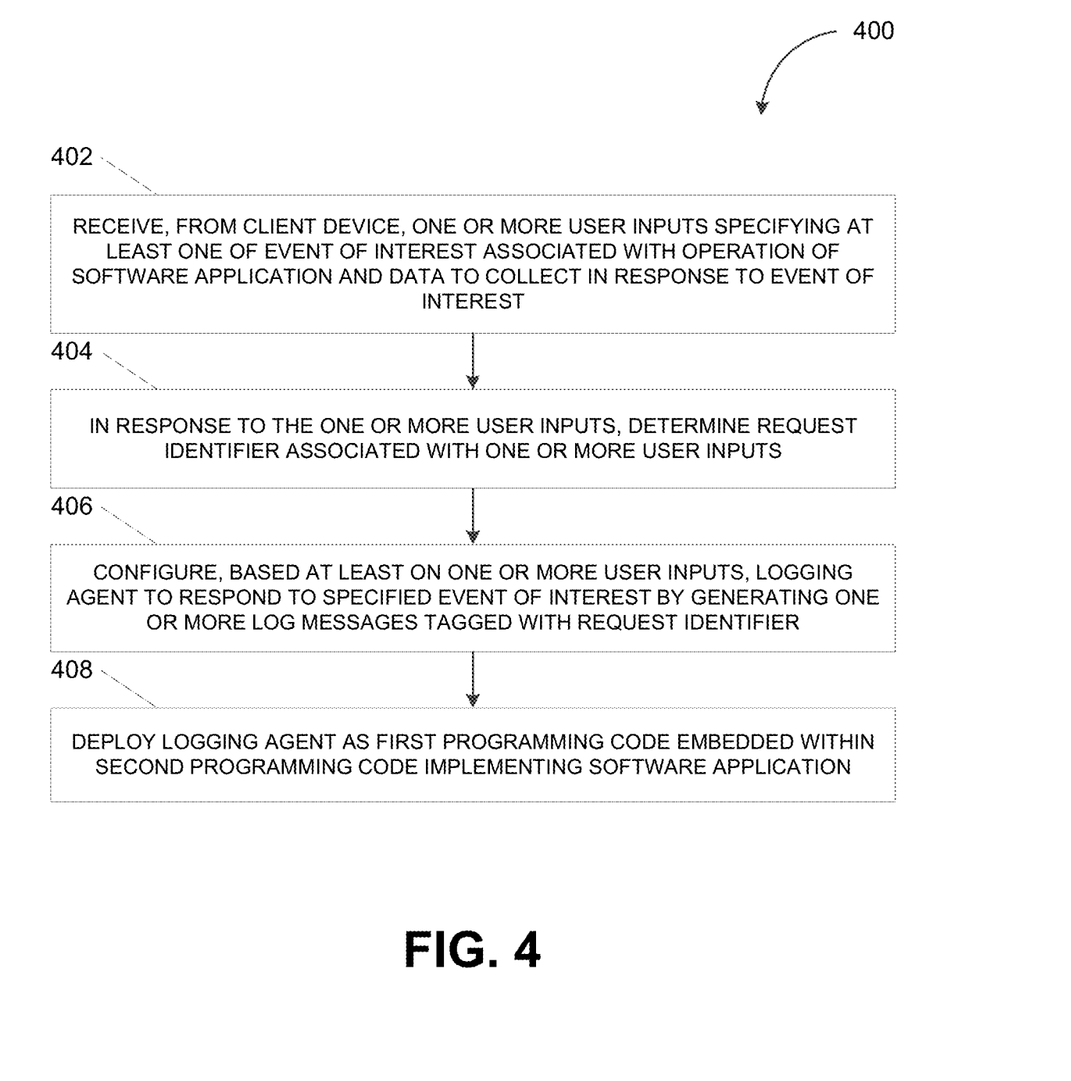
FIG. 4 depicts a flowchart illustrating an example of a process for configurable in-application event logging, in accordance with some example embodiments.

FIG. 4 depicts a flowchart illustrating an example of a process 400 for configurable in-application event logging, in accordance with some example embodiments. Referring to FIGS. 1-4, the process 400 may be performed by the logging controller 110 to configure the logging agent 140 to detect one or more events of interest that occur during the operation of the software application 125 deployed, for example, at the cloud computing platform 120.

At 402, the logging controller 110 may receive, from a client device, one or more user inputs specifying at least one of an event of interest associated with the operation of a software application and a data to collect in response to the event of interest. For example, the logging controller 110 may receive, from the client device 130, one or more user inputs specifying one or more events of interest that may occur during the operation of the software application 125 deployed at the cloud computing platform 120. In some instances, one or more user inputs may further identify specific data that is to be collected in response to the occurrence of the one or more events of interest. For instance, the one or more user inputs received from the client device 130 identify a tick handler failure and the corre-

TABLE 2 tick handler failure: tick handler returned with an error: transaction rolled back by lock wait timeout: TrexColumnUpdate failed on table
'F8250BE36DDA46A693F5EC99A01AAF9D:SAP_AFC_CORE_TASKEXECUTION' with error: transaction rolled back by lock wait timeout: Lock-wait time out exceeded [OWNER=38454374, TYPE=RECORD_LOCK, CURRENT_MODE=EXCLUSIVE, REQUESTED_MODE=EXCLUSIVE], rc=4628 at executeTick
(/home/vcap/app/srv/handlers/trigger/ticker.js:345:11) at runMicrotasks (<anonymous>) at processTicksAndRejections (internal/process/task _queues.js:97:5) { jse_shortmsg: 'tick handler returned with an error', jse_cause: [SqlError: transaction rolled back by lock wait timeout: TrexColumnUpdate failed on table
'F8250BE36DDA46A693F5EC99A01AAF9D:SAP_AFC CORE TASKEXECUTION' with error: transaction rolled back by lock wait timeout: Lock-wait time out exceeded [OWNER=38454374, TYPE=RECORD_LOCK, CURRENT_MODE=EXCLUSIVE, REQUESTED_MODE=EXCLUSIVE], rc=4628] { code: 131, sqlState: 'HY000', level: 1, position: 0, query: 'UPDATE sap_afc_core_TaskExecution SET ID = ?, createdAt = ?, createdBy = ?, modifiedAt = ?, modifiedBy = ?, taskListCode = ?, taskListInstance = ?, taskListType_code = ?, taskListContext_code = ?, taskCode = ?, folderCode = ?, jobName = ?, btcJobID = ? , lifeCycleStatus_code = ?, duration = ?, jobStartOn = ?, jobEndOn = ?, combinedStatus_code = ?, text = ?, isManuallyChanged = ?, isTestRun = ?, plannedJobStartOn = ?, approvalText = ?, country_code = ?, isOrgAssignmentCreated = ?, executionGroup_ID = ?, taskList_ID = ?, communicationProfile_ID = ?, companyCode_ID = ?, controllingArea_ID = ? , manufacturingUnit_ID = ?, consolidationGroup_ID = ?, consolidationUnit_ID = ? WHERE ID = ?', values: ['42010aee-0142-1edb-8aca-24e69da45b44', '2020-11-19T10:22:41.477Z', 'AFC_QIA_730', '2020-11-19T10:22:52.000Z', '[ ]', 'PDSE_QIA_JOBS_MANY_BUKRS_TMPL', '2020012', 1, 'ENTITY_CLS', '1', '3', 'FCC-PDSE QIA JOBS_MANY_B-1-1', '11224101', 'N', null, null, null, 'N', null, false, false, '2020-11-19T10:22:39Z', null, 'DEU', true, '10ea5735-958c-4b96-8fc0-48882def5a9d', '336bdda1-d2eb-4557-a337-852798e01cf1', '13146402-4379-4ae2-9b3b-a5ab53e51fba', 'ff95795c-bbfb-4e7b-be16-af9c6cfb3f3a', null, null, null, null, '42010aee-0142-1edb-8aca-24e69da45b44' ] }, jse_info: { tickId: 'job_result_sync' } }

Because the log message shown in Table 2 was not generated by the software application 125 but was triggered from inside the database layer, it lacks the contextual information necessary to trouble shoot the update failure. Accordingly, in some example embodiments, the logging agent 140 may be configured to respond to such a log message by collecting the additional information required to troubleshoot the update failure such as the process maintaining the table lock, the transaction implicitly locking the table, and additional data from the database layer. The logging agent 140 may in turn generate one or more additional log messages containing the additional information. Moreover, as noted, the logging agent 140 may tag these additional log messages with a request identifier to enable sponding log message shown in Table 2 as an event of interest. Furthermore, the one or more user inputs may identify additional information required to trouble shoot the tick handler failure such as the process maintaining the table lock, the transaction implicitly locking the table, and additional data from the database layer.

At 404, the logging agent 110 may determine a request identifier associated with the one or more user inputs. In some example embodiments, the logging controller 110 may assign, to each request to track one or more events of interest associated with the software application 125, a corresponding request identifier. The request identifiers may enable the logging controller 110 to? categorize the different log messages generated by the logging agent 140 in response to various events of interest. Furthermore, the request identifiers may enable the logging controller 110 determine the proper recipients of the log messages generated by the logging agent 140.

At 406, the logging agent 110 may configure, based at least on the one or more user inputs, the logging agent 140 to respond to the specified event of interest by generating one or more log messages tagged with the request identifier. In some example embodiments, the logging agent 140 may be configured to respond to an event of interest by generating one or more log message including information associated with the event of interest. For example, the logging agent 140 may be configured to respond to a log message indicating a tick handler failure at the software application 125 by collecting additional required to trouble shoot the tick handler failure such as the process maintaining the table lock, the transaction implicitly locking the table, and additional data from the database layer. The logging agent 140 may generate additional log messages which the logging controller 110 may forward, for example, to the client device 130.

At 408, the logging agent 110 may deploy the logging agent 140 as a first programming code that is embedded within a second programming code implementing the software application. In some example embodiments, the logging agent 140 may be deployed as a part of the software application 125. For example, a first programming code implementing the logging agent 140 may be incorporated in a second programming code implementing the software application 125, such as within the main program loop of the software application 125, in order for the logging agent 140 to be embedded in the runtime of the software application 125. In instances where the cloud computing platform 120 supports multiple tenants, an instance of the logging agent 140 with configurations specific to a particular tenant may reside within each executing instance of the software application 125 associated with that particular tenant. Accordingly, upon detecting the occurrence of an event of interest during the execution of the software application 125, the logging agent 140 may access the context of that executing instance of the software application 125 and retrieve information that is unavailable to an event logging service residing outside of the executing instance of the software application 125. For instance, in response to the occurrence of the event of interest, the logging agent 140 may collect the values of one or more variables operated upon by the executing instance of the software application 125 and generate one or more corresponding log messages.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

Example 2: The system of Example 1, wherein the operations further comprise: in response to receiving the one or more user inputs, determining a first request identifier associated with the one or more user inputs; and configuring the logging agent to tag the one or more log messages with the first request identifier.

Example 3: The system of any one of Examples 1 to 2, wherein the one or more user inputs further specify a data to collect in response to the event of interest, and wherein the logging agent is further configured to generate the one or more log messages to include the data.

Example 4: The system of any one of Examples 1 to 3, wherein the first programming code implementing the logging agent is included in a main program loop of the software application.

Example 5: The system of any one of Examples 1 to 4, wherein the first programming code implementing the logging agent is embedded within the second programming code implementing the software application such that an instance of the logging agent resides within each executing instance of the software application.

Example 6: The system of Example 5, wherein the instance of the logging agent responds to the specified event of interest occurring during an execution of the software application by at least accessing a context of the executing instance of the software application and generating the one or more log messages to include information associated with the context of the executing instance of the software application.

Example 7: The system of Example 6, wherein the information includes a value of one or more variables operated upon by the executing instance of the software application.

Example 8: The system of any one of Examples 1 to 7, wherein the one or more user inputs comprises a configuration for the logging agent, and wherein the configuration is stored in an in-memory data structure comprising a distributed, in-memory key-value database, cache, and message broker.

Example 9: The system of any one of Examples 1 to 8, wherein the logging agent is configured to respond to a first log message indicating an occurrence of the specified event of interest by at least generating a second log message including information associated with the specified event of interest.

Example 10: The system of any one of Examples 1 to 9, wherein the software application comprises an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

Example 11: A computer-implemented method, comprising: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

Example 12: The method of Example 11, further comprising: in response to receiving the one or more user inputs, determining a first request identifier associated with the one or more user inputs; and configuring the logging agent to tag the one or more log messages with the first request identifier.

Example 13: The method of any one of Examples 11 to 12, wherein the one or more user inputs further specify a data to collect in response to the event of interest, and wherein the logging agent is further configured to generate the one or more log messages to include the data.

Example 14: The method of any one of Examples 11 to 13, wherein the first programming code implementing the logging agent is included in a main program loop of the software application.

Example 15: The method of any one of Examples 11 to 14, wherein the first programming code implementing the logging agent is embedded within the second programming code implementing the software application such that an instance of the logging agent resides within each executing instance of the software application.

Example 16: The method of Example 15, wherein the instance of the logging agent responds to the specified event of interest occurring during an execution of the software application by at least accessing a context of the executing instance of the software application and generating the one or more log messages to include information associated with the context of the executing instance of the software application.

Example 17: The method of Example 16, wherein the information includes a value of one or more variables operated upon by the executing instance of the software application.

Example 18: The method of any one of Examples 11 to 17, wherein the one or more user inputs comprises a configuration for the logging agent, and wherein the configuration is stored in an in-memory data structure comprising a distributed, in-memory key-value database, cache, and message broker.

Example 19: The method of any one of Examples 11 to 18, wherein the logging agent is configured to respond to a first log message indicating an occurrence of the specified event of interest by at least generating a second log message including information associated with the specified event of interest.

Example 20: A non-transitory computer readable medium storing instructions, which when executed by at least one data processor, result in operations comprising: receiving, from a client device, one or more user inputs specifying an event of interest associated with an operation of a software application; configuring, based at least on the one or more user inputs, a logging agent to respond to the specified event of interest by generating one or more log messages; and deploying the logging agent as a first programming code embedded within a second programming code implementing the software application.

Figure 5:
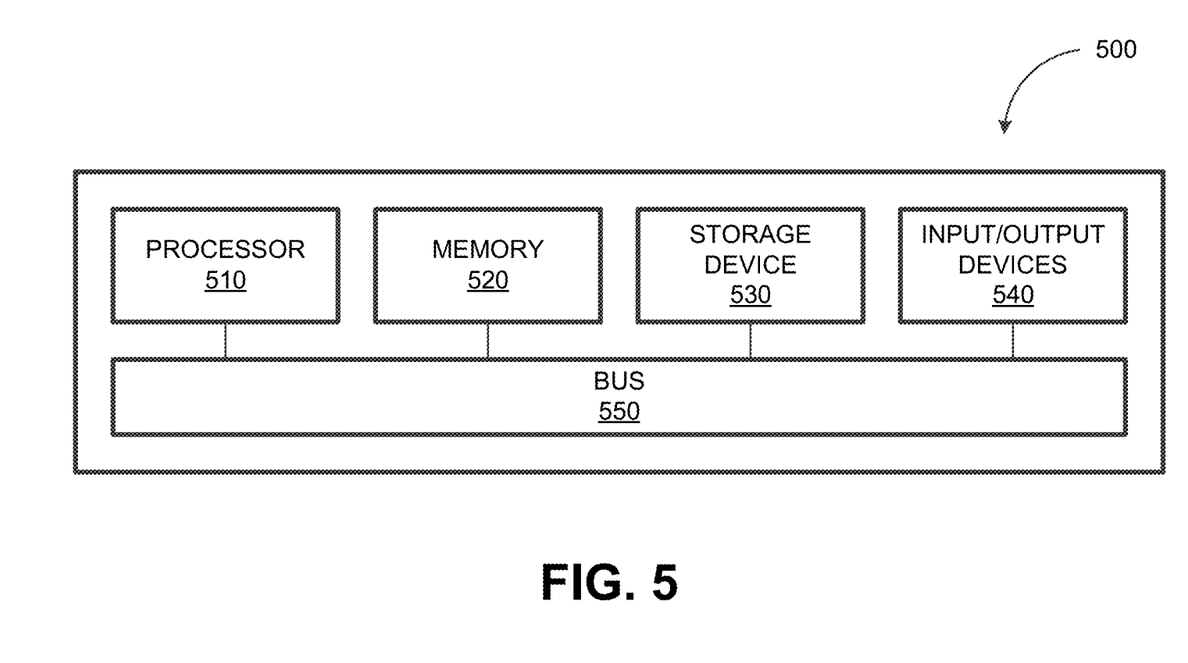
FIG. 5 depicts a block diagram illustrating an example of a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1-5, the computing system 500 can be used to implement the logging controller 110 and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the logging controller 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   receiving, from a client device, one or more user inputs specifying an event of interest associated with an operation of a software application;
   configuring, based at least on the one or more user inputs, a logging agent to respond to the specified event of interest by generating one or more log messages;
   deploying the logging agent as a first programming code embedded within a second programming code implementing the software application; and
   responding, by the logging agent, to a first log message indicating an occurrence of the specified event of interest by at least generating a second log message including information associated with the specified event of interest.

2. The system of claim 1, wherein the operations further comprise:
   in response to receiving the one or more user inputs, determining a first request identifier associated with the one or more user inputs; and
   configuring the logging agent to tag the one or more log messages with the first request identifier.

3. The system of claim 1, wherein the one or more user inputs further specify a data to collect in response to the specified event of interest, and wherein the operations further comprise generating, by the logging agent, the one or more log messages to include the data.

4. The system of claim 1, wherein the first programming code implementing the logging agent is included in a main program loop of the software application.

5. The system of claim 1, wherein the first programming code implementing the logging agent is embedded within the second programming code implementing the software application such that an instance of the logging agent resides within each executing instance of the software application.

6. The system of claim 5, wherein the instance of the logging agent responds to the specified event of interest occurring during an execution of the software application by at least accessing a context of the executing instance of the software application and generating the one or more log messages to include information associated with the context of the executing instance of the software application.

7. The system of claim 6, wherein the information includes a value of one or more variables operated upon by the executing instance of the software application.

8. The system of claim 1, wherein the one or more user inputs comprises a configuration for the logging agent, and wherein the configuration is stored in an in-memory data structure comprising a distributed, in-memory key—value database, cache, and message broker.

9. The system of claim 1, wherein the one or more user inputs specify tenant-specific configurations for the logging agent, and wherein the operations further comprise responding, by the logging agent, to the specified event of interest by collecting tenant-specific data as defined by the one or more user inputs.

10. The system of claim 1, wherein the software application comprises an enterprise resource planning (ERP) application, a customer relationship management (CRM) application, a process management application, a process intelligence application, a sales engagement application, a territory and quota management application, an agent performance management (APM) application, a social networking application, a data warehousing application, and/or a logistics collaboration application.

11. A computer-implemented method, comprising:
   receiving, from a client device, one or more user inputs specifying an event of interest associated with an operation of a software application;
   configuring, based at least on the one or more user inputs, a logging agent to respond to the specified event of interest by generating one or more log messages;
   deploying the logging agent as a first programming code embedded within a second programming code implementing the software application; and
   responding, by the logging agent, to a first log message indicating an occurrence of the specified event of interest by at least generating a second log message including information associated with the specified event of interest.

12. The method of claim 11, further comprising:
   in response to receiving the one or more user inputs, determining a first request identifier associated with the one or more user inputs; and
   configuring the logging agent to tag the one or more log messages with the first request identifier.

13. The method of claim 11, wherein the one or more user inputs further specify a data to collect in response to the event of interest, and wherein method further comprises generating the one or more log messages to include the data.

14. The method of claim 11, wherein the first programming code implementing the logging agent is included in a main program loop of the software application.

15. The method of claim 11, wherein the first programming code implementing the logging agent is embedded within the second programming code implementing the software application such that an instance of the logging agent resides within each executing instance of the software application.

16. The method of claim 15, wherein the instance of the logging agent responds to the specified event of interest occurring during an execution of the software application by at least accessing a context of the executing instance of the software application and generating the one or more log messages to include information associated with the context of the executing instance of the software application.

17. The method of claim 16, wherein the information includes a value of one or more variables operated upon by the executing instance of the software application.

18. The method of claim 11, wherein the one or more user inputs comprises a configuration for the logging agent, and wherein the configuration is stored in an in-memory data structure comprising a distributed, in-memory key-value database, cache, and message broker.

19. The method of claim 11, wherein the one or more user inputs specify tenant-specific configurations for the logging agent, and wherein the method further comprising responding, by the logging agent, to the specified event of interest by collecting tenant-specific data as defined by the one or more user inputs.

20. A non-transitory computer readable medium storing instructions, which when executed by at least one data processor, result in operations comprising:
   receiving, from a client device, one or more user inputs specifying an event of interest associated with an operation of a software application;
   configuring, based at least on the one or more user inputs, a logging agent to respond to the specified event of interest by generating one or more log messages;
   deploying the logging agent as a first programming code embedded within a second programming code implementing the software application, and
   responding, by the logging agent, to a first log message indicating an occurrence of the specified event of interest by at least generating a second log message including information associated with the specified event of interest.

* * * * *